US012769733B2

(12) United States Patent
Roh et al.

(10) Patent No.: US 12,769,733 B2
(45) Date of Patent: Oct. 20, 2026

(54) METHOD AND APPARATUS FOR IMPROVING VECTOR SEARCH EFFICIENCY FOR MULTIMODAL DATA IN VECTOR DATABASES

(71) Applicant: Dnotitia.Inc., Seoul (KR)

(72) Inventors: Hong Chan Roh, Seongnam-si (KR); Moo Hyeon Nam, Seoul (KR); Moo Kyoung Chung, Yongin-si (KR)

( * ) Notice: Subject to any disclaimer, the term of this patent is extended or adjusted under 35 U.S.C. 154(b) by 0 days.

(21) Appl. No.: 19/194,247

(22) Filed: Apr. 30, 2025

(65) Prior Publication Data

US 2025/0335436 A1 Oct. 30, 2025

(30) Foreign Application Priority Data

Apr. 30, 2024 (KR) ........................ 10-2024-0058188

(51) Int. Cl.
*G06F 16/2453* (2019.01)
*G06F 16/22* (2019.01)

(52) U.S. Cl.
CPC ...... *G06F 16/2453* (2019.01); *G06F 16/2237* (2019.01)

(58) Field of Classification Search
CPC ........................... G06F 16/24578; G06F 16/26
See application file for complete search history.

(56) References Cited

U.S. PATENT DOCUMENTS

2022/0391433 A1* 12/2022 Maheshwari ........ G06V 10/426
2023/0103305 A1* 4/2023 Xu ........................ G06F 40/205
382/156

FOREIGN PATENT DOCUMENTS

CN 115757465 A 3/2023
KR 102476499 B1 12/2022

OTHER PUBLICATIONS

Office Action dated Feb. 26, 2026 in corresponding Korean Application No. 10-2024-0058188.

* cited by examiner

*Primary Examiner* — Hau H Hoang
(74) *Attorney, Agent, or Firm* — USX IP LLC

(57) ABSTRACT

Provided are a method and apparatus for improving vector search efficiency for multimodal data in vector databases. The method includes: generating a first vector index structure for first modality data; generating a second vector index structure for second modality data different from the first modality data; connecting the first vector index structure and the second vector index structure; and searching for a node similar to a query vector using the connected first vector index structure and second vector index structure. According to the method, it is possible to improve the accuracy of a vector search for multimodal data.

12 Claims, 7 Drawing Sheets

METHOD AND APPARATUS FOR IMPROVING VECTOR SEARCH EFFICIENCY FOR MULTIMODAL DATA IN VECTOR DATABASES

CROSS-REFERENCE TO RELATED APPLICATION

This application claims priority to and the benefit of Korean Patent Application No. 10-2024-0058188, filed on Apr. 30, 2024, the disclosure of which is incorporated herein by reference in its entirety.

BACKGROUND

1. Field of the Invention

The present disclosure relates to a method and apparatus for improving vector search efficiency for multimodal data in vector databases.

2. Discussion of Related Art

Recently, as the number of companies seeking to apply generative artificial intelligence to their internal systems is increasing, technologies are being developed to support more effective use of a large language model (LLM). Technology architecture, such as the development frameworks LangChain or LlamaIndex, in-context learning, and a vector database (vector DB), which constitutes the LLM, is attracting attention. In particular, the vector DB stores unstructured data such as tables, graphs, images, videos, and voice data and supports searching for unlabeled content.

In this regard, multimodal data processing technology that trains and processes relationships between various types of data modalities such as text, images, audio, and video is receiving attention. This is because multimodal learning enables mutual complementation between different data and enables more accurate and effective data analysis. Since the data of each modality has unique characteristics, it is difficult to obtain sufficient information with only the data of a single modality. For example, in the case of a product manual, when there are related images or videos along with text descriptions, understanding by a user may be improved. In addition, in medical data analysis, more accurate diagnosis and treatment are made possible by comprehensively utilizing patient record texts, medical images, vital sign data, etc.

SUMMARY OF THE INVENTION

The present disclosure is directed to providing a vector database index structure and a query search method of improving the accuracy of vector search for multimodal data.

In addition, the present disclosure is directed to providing a vector database system that encodes various types of data, such as text, images, audio, video, tables, and graphs, into a single vector space and connects vector distribution for each modality.

Problems to be solved by the present disclosure are not limited to the above-described objects, and objects that are not mentioned will be clearly understood by those skilled in the art to which the present disclosure pertains based on the present specification and the accompanying drawings.

According to an aspect of the present invention, there is provided a method of searching vectors for multimodal data in a server, including: generating a first vector index structure for first modality data; generating a second vector index structure for second modality data different from the first modality data; connecting the first vector index structure and the second vector index structure; and searching for a node similar to a query vector using the connected first vector index structure and second vector index structure.

According to another aspect of the present invention, there is provided a server for searching for vectors for multimodal data, including: a communication unit that receives a query; and a processor that executes instructions, in which the processor may be configured to execute the instructions to generate a first vector index structure for first modality data, generate a second vector index structure for second modality data different from the first modality data, connect the first vector index structure and the second vector index structure, and search for a node similar to a query vector using the connected first vector index structure and second vector index structure.

According to still another aspect of the present invention, there is provided a non-transitory computer-readable recording medium on which a computer program executed by a computer device is recorded, in which the computer program may include: generating a first vector index structure for first modality data; generating a second vector index structure for second modality data different from the first modality data; connecting the first vector index structure and the second vector index structure; and searching for a node similar to a query vector using the connected first vector index structure and second vector index structure.

Technical solutions of the present disclosure are not limited to the above-described solutions, and solutions that are not mentioned will be clearly understood by those skilled in the art to which the present disclosure pertains from the present specification and the accompanying drawings.

BRIEF DESCRIPTION OF DRAWINGS

The above-described tasks, other tasks, features, and advantages of the present disclosure will become more apparent to those skilled in the art to which the present disclosure belongs by describing exemplary embodiments of the present disclosure in detail with reference to the attached drawings.

DETAILED DESCRIPTION OF EXEMPLARY EMBODIMENTS

Figure 1:
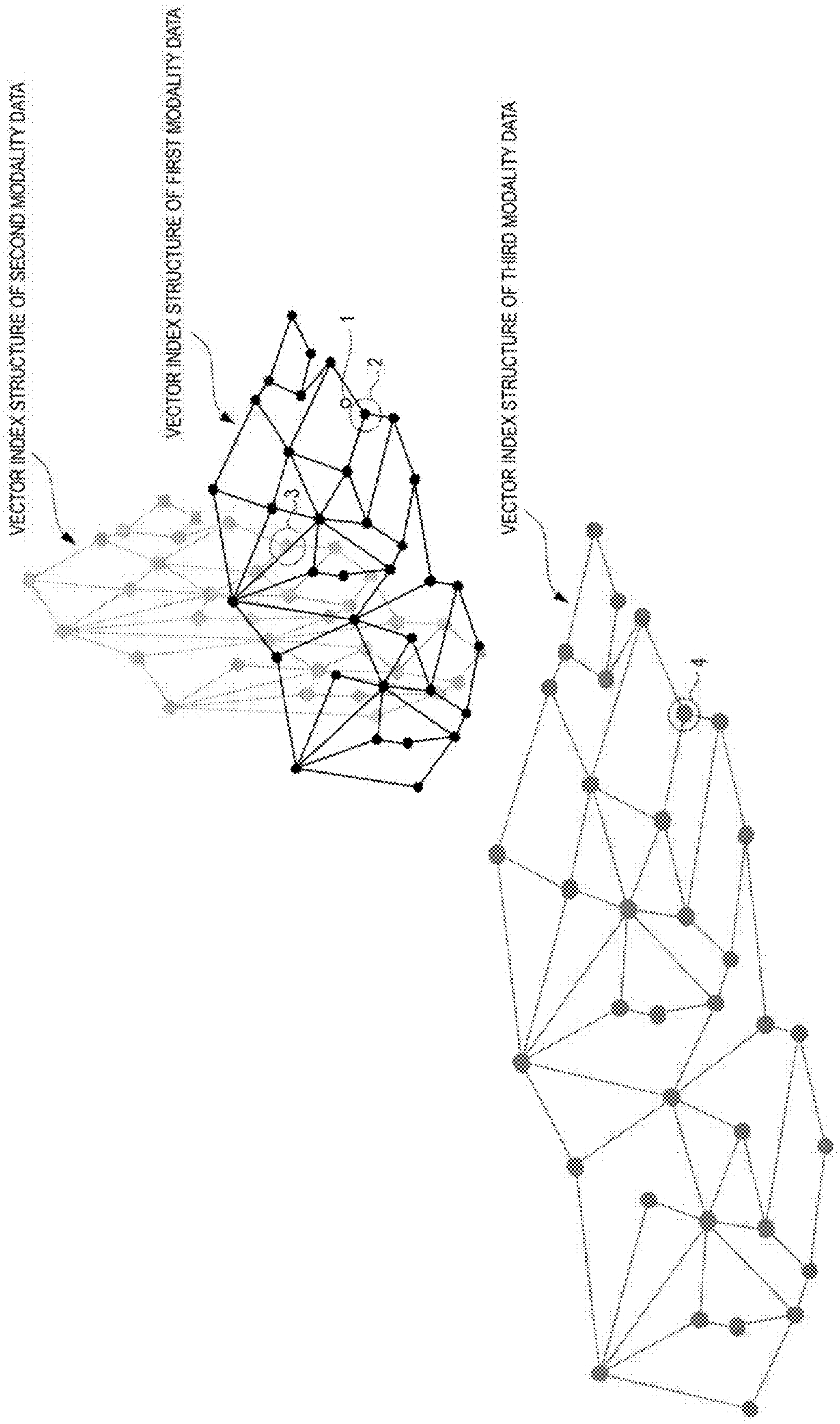
FIG. 1 is a diagram for describing a problem of a query search for multimodal data in a vector database index structure.

Hereinafter, exemplary embodiments of the present disclosure will be described with reference to the accompanying drawings.

However, exemplary embodiments in the present disclosure may be modified in several other forms, and the scope of the present disclosure is not limited to exemplary embodiments to be described below. Rather, these embodiments of the present disclosure are provided so that the present disclosure will completely describe the present disclosure to those skilled in the art.

That is, the above-described objects, features, and advantages will be described below in detail with reference to the accompanying drawings, and accordingly, those skilled in the art to which the present disclosure pertains will be able to easily implement the technical idea of the present disclosure. When it is decided that detailed description of known art related to the present disclosure may unnecessarily obscure the gist of the present disclosure, a detailed description therefor will be omitted. Hereinafter, exemplary embodiments of the present disclosure will be described in detail with reference to the accompanying drawings. In the drawings, the same reference numerals are used to indicate the same or similar components.

In addition, singular forms used in the specification are intended to include plural forms unless the context clearly indicates otherwise. In the present specification, the terms "comprising," "including," and the like are not to be construed as necessarily including several components or several steps described in the specification, and it is to be construed that some of the above components or steps may not be included or additional components or steps may be further included.

In addition, in order to describe a system according to the present disclosure, various components and sub-components thereof will be described below. These components and their sub-components may be implemented in various forms, such as hardware, software, or a combination thereof. For example, each element may be implemented as an electronic configuration for performing a corresponding function, or may be implemented as software in itself that it can be run in an electronic system or implement as one functional element of such software. Alternatively, it may be implemented as an electronic configuration and drive software corresponding thereto.

Various techniques described in the present specification may be implemented with hardware, software, or a combination of both if appropriate. As used in the present specification, the terms "unit," "server," "system," and the like refer to a computer-related entity, that is, hardware, a combination of hardware and software, software, or an equivalent to software or software when executed. In addition, each function executed in the system of the present disclosure may be configured in module units and recorded in one physical memory or distributed between two or more memories and recording media.

Although various flowcharts are disclosed to describe the embodiments of the present disclosure, this is for convenience of description of each step, and each step is not necessarily performed according to the order of the flowchart. That is, each operation in the flowchart may be performed simultaneously with each other, performed in an order according to the flowchart, or may be performed in an opposite order to the order in the flowchart.

FIG. 1 is a diagram for describing a problem of query search for multimodal data in a vector database index structure.

Multimodal data with different data characteristics, such as text, images, audio, video, and charts, are expressed differently in a vector distribution for each modality.

For example, text is generally vectorized by word embedding, and images are vectorized by a convolutional neural network (CNN)-based model. In this case, text is generally expressed as a vector with hundreds of dimensions, and images are expressed as vectors with thousands to tens of thousands of dimensions. In this way, each modality has different dimension in a feature space, and vector distributions are also expressed differently.

Even when vector spaces of different modalities are projected into a common normalized space through space normalization, there are differences in statistical distributions unique to each modality, and since each modality expresses a different semantic space, vector distributions are expressed differently. This is because text data has sparse characteristics, while image data has dense characteristics, and text expresses linguistic meaning, while images express visual meaning. For this reason, vectors for voice, text, and images, respectively, have different distributions, as illustrated in FIG. 1, even when they are vectors for substantially the same meaning.

However, when supporting a vector index structure to support a vector search for multimodal data in a vector database, when there is a difference in the vector distribution for each modality is, the vector search efficiency may decrease.

When searching for an approximate nearest neighbor in a vector index structure to increase computational efficiency, if vector distributions for each modality are different, similarity calculation results are distorted, making it difficult to find the desired approximate nearest neighbor.

In the example of FIG. 1, when nodes 2, 3, and 4 are data points for substantially the same meaning in different modalities, the similar calculation results among the nodes 2, 3, and 4 and query 1 should have similarity. However, as illustrated in FIG. 1, when there is a different vector distribution for each modality, the similarity calculation results in the vector index structure may be distorted.

In addition, when forming a tree-structured index by hierarchically dividing the data space in the vector database, when the vector distributions of different modalities do not overlap but are heterogeneous, space division may not be efficient, and the search performance may also deteriorate. In addition, when the data distribution of some modalities are very dense and other modalities are very sparse, the vector index may be constructed in a biased manner toward a specific modality, which may lower the overall search efficiency.

Figure 2:
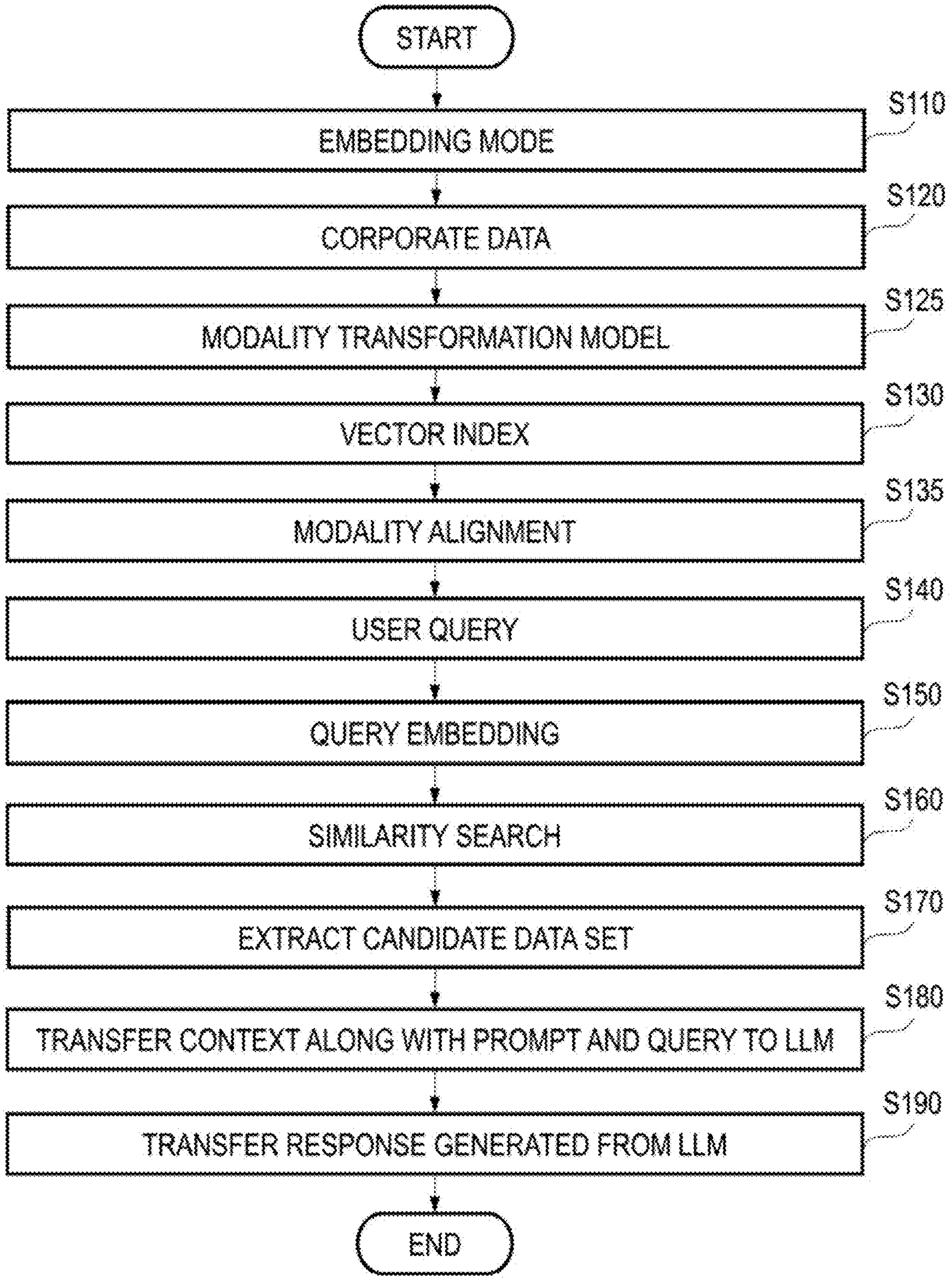
FIG. 2 is a flowchart for describing a method of supporting multimodal query search in a vector database by connecting vector distribution of multimodality data for each modality according to an embodiment of the present disclosure.

FIG. 2 is a flowchart for describing a method of supporting a multimodal query search of a vector database by connecting vector distributions of multimodality data for each modality in a multimodal query search service server according to an embodiment of the present disclosure.

In operation S110 of FIG. 2, the multimodal query search service server (hereinafter referred to as a "service server") may prepare a vector embedding model. The vector embedding may be defined as mapping structured data and/or unstructured data, such as text, images, audio, video, tables, and graphs, to a multidimensional vector space by reflecting data features. In this way, semantic similarity of data may be measured. The vector embedding may be performed in various ways, and the present disclosure should not be construed as being limited to a particular way.

The vector embedding model according to an embodiment of the present disclosure may be prepared by fine-tuning a pre-trained vision language model to extract semantically-aligned representations between two modalities by training image data and text data together. To this end, the service server may construct a positive pair data set defined to have the same features for image-text pairs and a negative pair data set defined to have different features for the image-text pairs and train the vision language model in a way that minimizes contrastive loss for the data sets.

In particular, the vector embedding model according to an embodiment of the present disclosure has features of being able to extract the semantically-aligned vector representations from a common embedding space for images and texts.

According to another embodiment of the present disclosure, the vector embedding model may mean a set of conventional encoder models for each modality. Conventional encoder models include text encoders such as bidirectional encoder representations from transformers (BERT), image encoders such as a residual network (ResNet), audio encoders such as WaveNet, and video encoders such as inflated 3D ConvNet (I3D). However, the present disclosure should not be interpreted as being limited thereto.

In operation S120, the service server may secure corporate data of a service target company. The corporate data may include unstructured data such as images, PDFs, tables, graphs, charts, and video. The service server may assign a tenant for a target company and apply the corporate data to a vector embedding model to express features of the corporate data as vector values.

In operation S130, the service server may structure the corporate data into a vector database.

In this case, an index may be formed for an effective search of a high-dimensional vector data set. Indexing may be performed in various ways, and the present disclosure should not be construed as being limited to a specific way.

The vector database according to the embodiment of the present disclosure may be expressed as a graph that includes nodes representing feature values of data points of corporate data and edges representing correlations between multiple nodes.

In this case, the graph may be formed to have a hierarchical structure. For example, the vector of data point is expressed as a graph node, and adjacent vectors may be connected by edges. Furthermore, multiple layers may be formed, and a hierarchical structure may be generated by forming all nodes in the lowermost layer and forming increasingly fewer nodes in upper layers.

Meanwhile, according to the embodiment of the present disclosure, in order to support a multimodal query search in operation S125 prior to operation S130, arbitrary modality data may be expressed to have a different modality. To this end, the service server may apply a modality transformation model to arbitrary modality data to generate different modality data.

For example, the service server may encode input modality data into a vector representation in an encoder through a generation model of an encoder-decoder structure and then input the vector representation into a decoder to generate target modality data. For text-to-image generation, a text encoder (e.g., BERT) and an image decoder (e.g., GAN and VAE) may be used. For image captioning, an image encoder (e.g., CNN and ViT) and a text decoder (e.g., a transformer) may be used. In the example of the preceding operation S110, caption text data for image data may be generated using a vision language model.

Thereafter, the service server according to an embodiment of the present disclosure, in operation S130, may apply original modality data to the vector embedding model to generate a first vector index and apply other modality data generated from the original modality data to the same vector embedding model to generate a second vector index, respectively.

In this case, the vector embedding model may extract vector representations from a common embedding space for the original modality data and other modality data.

For example, the service server may generate a first vector index structure for the image data. The service server may generate a second vector index structure for the caption text data extracted from the image data. In this case, since the image data and the caption text data are substantially the same content but have different modalities, the first vector index structure and the second vector index structure will have different distributions.

Thereafter, the service server according to an embodiment of the present disclosure may connect vector indexes of different modalities in operation S135. For example, the first vector index and the second vector index may be connected by connecting each node of the second vector index to an embedding node for the original image used to generate the text embedding of the corresponding node. In this case, the connection between the first vector index and the second vector index may connect all the corresponding nodes, connect only randomly extracted nodes, or connect nodes with high priorities by clustering the nodes.

When a user query is received by the service server in operation S140, the service server may express the query as a vector value by applying the query to the vector embedding model in operation 150. This is to search for data similar to the query from the corporate data.

Thereafter, in operation S160, the service server may perform a similarity search. That is, the service server may search for a candidate data set based on the similarity between the corporate data vector and the query vector in the vector database.

For example, the image data may be searched with a text query, the text data may be searched with an image query, or the chart data may be searched with a text query. The vector search for multimodal data according to an embodiment of the present disclosure is described below with reference to the attached drawings.

Thereafter, in operation S170, the service server may extract a candidate data set based on the similarity with the query vector.

Then, in operation S180, the service server may transmit the query, the candidate data set, and the context to the LLM along with a prompt for receiving an appropriate response. The LLM may generate a response required by the user based on the received data.

In operation 190, the service server may transmit the response received from the LLM to the user.

Figure 3:
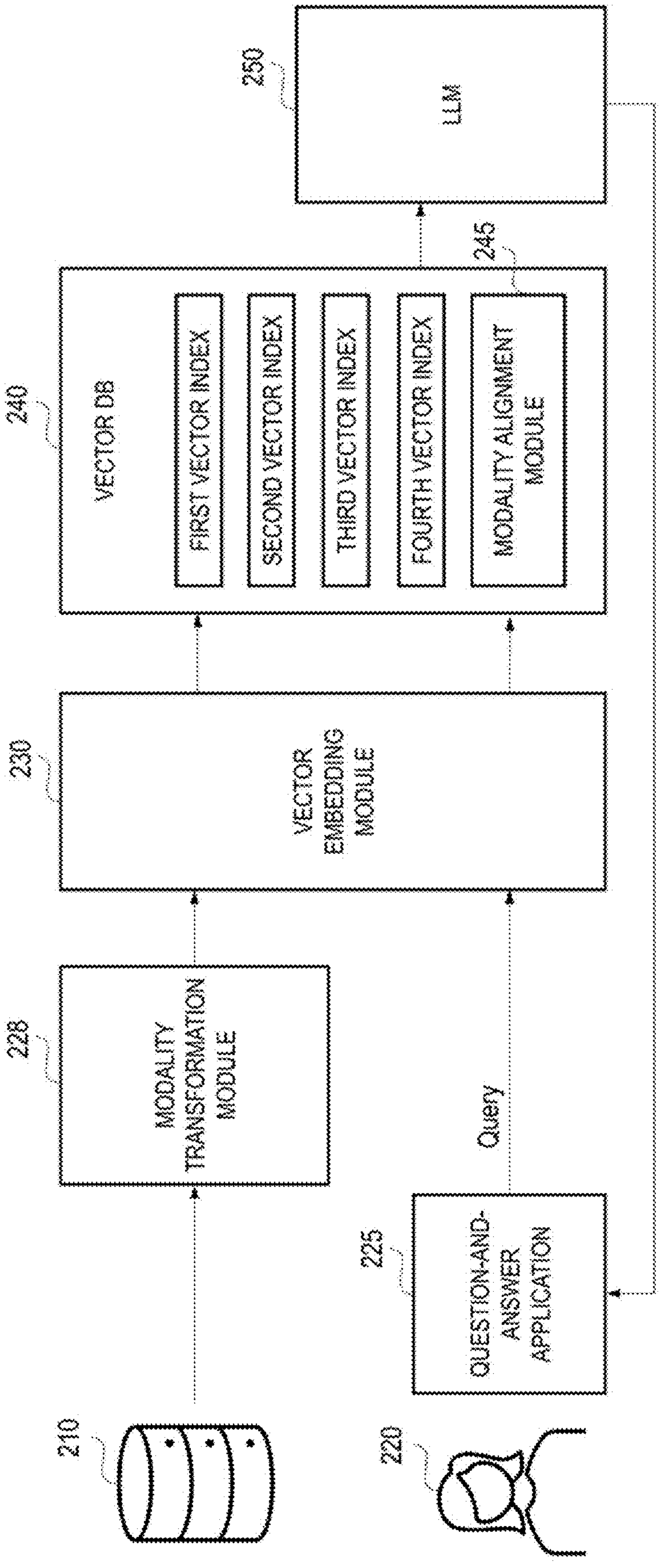
FIG. 3 is a diagram for describing a vector database system for encoding various modality data into a single vector space and connecting vector distribution for each modality, and a structure of a query search system using the same according to an embodiment of the present disclosure.

FIG. 3 is a diagram for describing a vector database system for encoding various modality data into a single vector space and connecting vector distributions by modality, and a structure of a query search system using the same according to an embodiment of the present disclosure.

Each block of FIG. 3 is for describing a structure of a query search system (hereinafter referred to as "system") according to an embodiment of the present disclosure. Each block may not be interpreted as being limited to an individual physical device and may include virtualized computing resources.

Referring to FIG. 3, a system according to an embodiment of the present disclosure may include a storage 210, a question-and-answer application 225, a modality transformation module 228, a vector embedding module 230, a vector database 240, and/or an LLM 250.

The storage 210 of FIG. 3 stores corporate data, for example, corporate internal data. The storage 210 may perform a function of storing structured data and/or unstructured data.

The modality transformation module 228 of FIG. 3 may include a model that transforms arbitrary modality data into another modality to support a multimodal query search, or a module that supports the function thereof. When the modality transformation module 228 is applied to original data of the storage 210, the modality of the original data may be transformed into another modality. In this case, the original data may be maintained.

For example, the modality transformation module 228 may be a generation model of an encoder-decoder structure. A modality transformation module 228 may encode input modality data as a vector representation in an encoder and then input the vector representation into a decoder to generate target modality data. Specifically, for the text-to-image generation, the text encoder (e.g., BERT) and the image decoder (e.g., GAN and VAE) may be used. For the image captioning, the image encoder (e.g., CNN and ViT) and the text decoder (e.g., transformer) may be applied. For example, the modality transformation module 228 may generate the caption text data from the original image data using the vision language model.

The vector embedding module 230 of FIG. 3 performs the vector embedding. To this end, the vector embedding module 230 may include a vector embedding model. The vector embedding may be defined as mapping structured data and/or unstructured data, such as text, images, voice, tables, and graphs, to a multidimensional vector space by reflecting data features. In this way, semantic similarity of data may be measured. The vector embedding may be performed in various ways, and the present disclosure should not be construed as being limited to a particular way.

The vector embedding model according to an embodiment of the present disclosure may be prepared by fine-tuning a pre-trained vision language model to extract semantically-aligned representations between two modalities by training image and text data together. To this end, the positive pair data set defined to have the same features for the image-text pairs and the negative pair data set defined to have different features for the image-text pairs may be constructed, and the vector embedding model may be prepared by training the vision language model in a way that minimizes the contrastive loss for the data sets.

In particular, the vector embedding model according to an embodiment of the present disclosure has the feature of being able to extract the semantically-aligned vector representations from a common embedding space for images and texts.

A vector database 240 of FIG. 3 may be expressed as a graph including nodes representing feature values of data points of the corporate data and edges representing correlations between multiple nodes. In this case, the graph may be formed to have a hierarchical structure. When the vector embedding module 230 is applied to data of the storage 210, the data is embedded, and an index may be formed in the vector database 240 for an effective search of a high-dimensional vector data set.

The vector database according to an embodiment of the present disclosure may apply original modality data to a vector embedding model to generate the first vector index, and extract a representation of other modality data generated from the original modality data in the same embedding space as the first vector index to generate the second vector index.

For example, the vector database 240 may include the first vector index structure for the image data, and the second vector index structure for the caption text data extracted from the image data. In this case, since the image data and the caption text data substantially have the same content but have different modalities, the first vector index structure and the second vector index structure will have different distributions.

The vector database 240 according to an embodiment of the present disclosure may include a modality alignment module 245, which is for connecting and/or aligning vector indexes of different modalities. For example, the modality alignment module 245 may connect the first vector index and the second vector index by connecting each node of the second vector index to the embedding node for the original image used to generate the text embedding of the corresponding node. In this case, the modality alignment module 245 may connect all of the corresponding nodes of the first vector index and the second vector index, connect only randomly extracted nodes, or connect nodes with high priorities by clustering the nodes.

Meanwhile, a user 220 of FIG. 3 may input a query through the question-and-answer application 225 provided by the system according to an embodiment of the present disclosure. The query of the user may be expressed as a vector value when the vector embedding module 230 is applied. This is to search for a candidate data set based on the similarity to the query vector in the vector database 240.

When the candidate data set is extracted based on the similarity to the query vector in the vector database 240 of FIG. 3, the LLM 250 may receive the query, the candidate data set, and the context along with the prompt. Thereafter, when the LLM 250 returns a response to the question-and-answer application 225, the user 220 may confirm the response to the query.

Figure 4A:
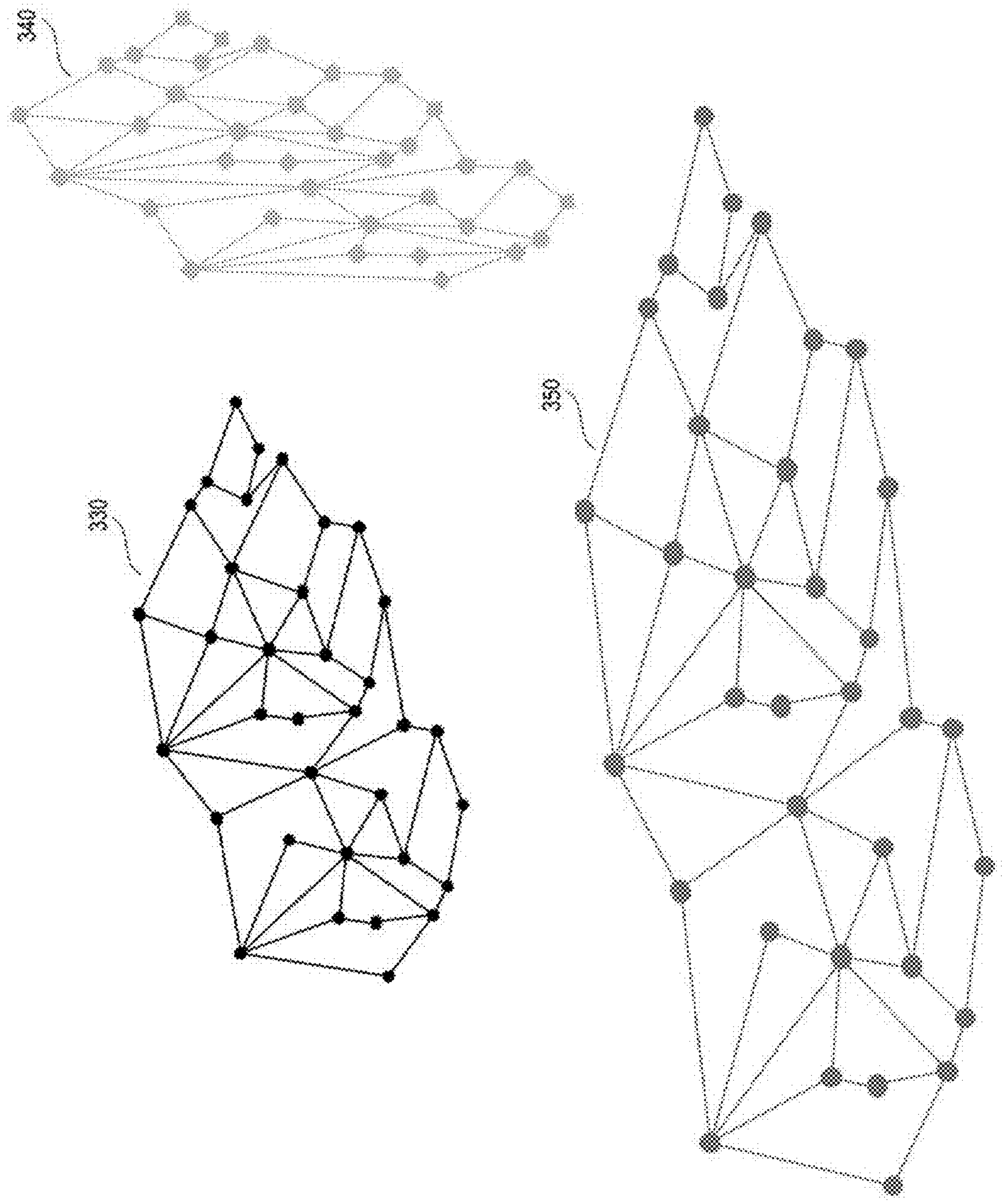
FIGS. 4A to 4C are diagrams for describing a vector index structure of a vector database and a query search method of improving the accuracy of a vector search for multimodal data according to an embodiment of the present disclosure.
Figure 4B:
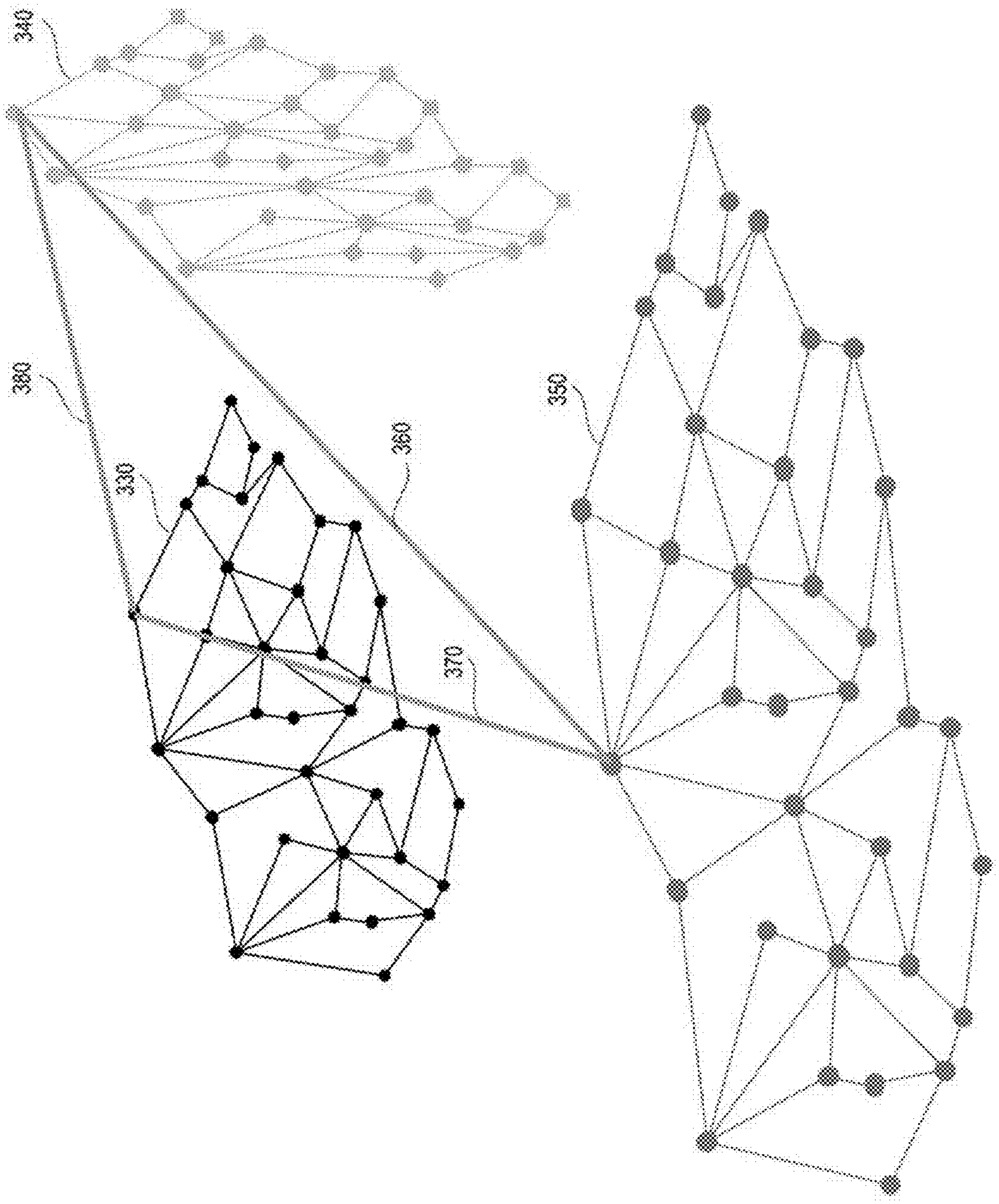
Figure 4C:
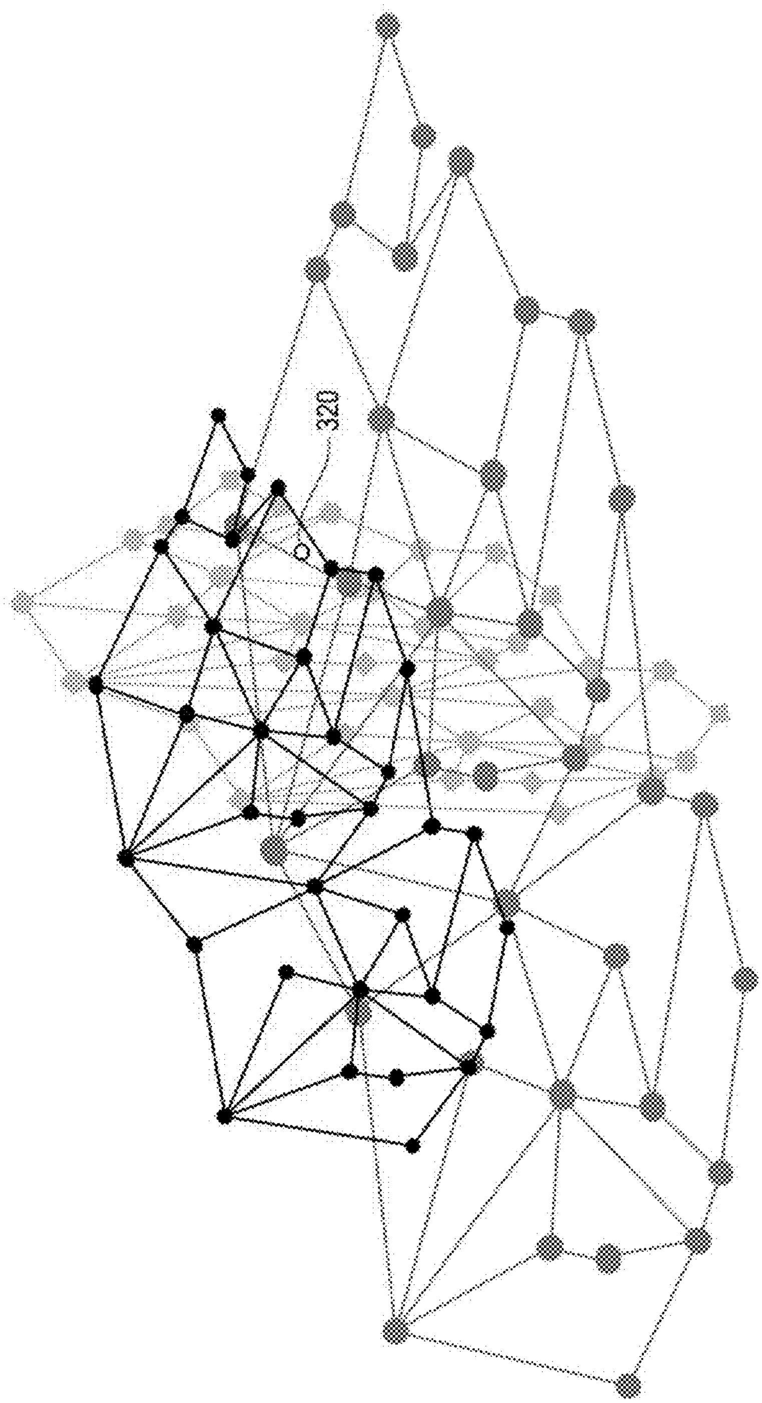

FIGS. 4A to 4C are diagrams for describing a vector index structure of a vector database and a query search method for improving the accuracy of a vector search for multimodal data according to an embodiment of the present disclosure.

According to an embodiment of the present disclosure, as shown in FIG. 4A, at least one arbitrary vector index structure expressing arbitrary modality data in another modality may be formed. For example, when 330 is a vector index structure for original data, 340 may be a vector index structure for data transformed from the original data into another modality, and 350 may be a vector index structure of data transformed from the original data into another modality. For example, when 330 is a vector index structure (hereinafter referred to as the "first vector index structure") of the original image data, 340 may be a vector index structure (hereinafter referred to as the "second vector index structure") of the caption text data extracted from the original image data, and 350 may be a vector index structure (hereinafter referred to as the "third vector index structure") of the audio data generated from the caption text data. In this case, since the image data, the caption text data, and the audio data have the same source but different modalities, there are different distributions of the first vector index structure 330, the second vector index structure 340, and the third vector index structure 350, as illustrated in FIG. 4A.

In this case, according to an embodiment of the present disclosure, vector indexes of different modalities may be connected, as illustrated in FIG. 4B. For example, each node of the second vector index structure 340 and each node of the third vector index structure 350 may be connected (360, 370, and 380) to the embedding node for the first vector index structure 330 of the original image data used to generate the embedding of the corresponding node, thereby connecting the multimodal vector indexes. In this case, the connection between the multimodal vector indexes may connect the entire corresponding nodes, connect only the randomly extracted nodes, or connect nodes with high priorities by clustering the nodes.

Once the connection nodes are determined, the vector indexes among the modalities are connected as illustrated in FIG. 4C. As a result, when the query 320 is an image, text, or audio, there is an effect that accuracy of the search for the vector database 240 may be maintained.

Figure 5:
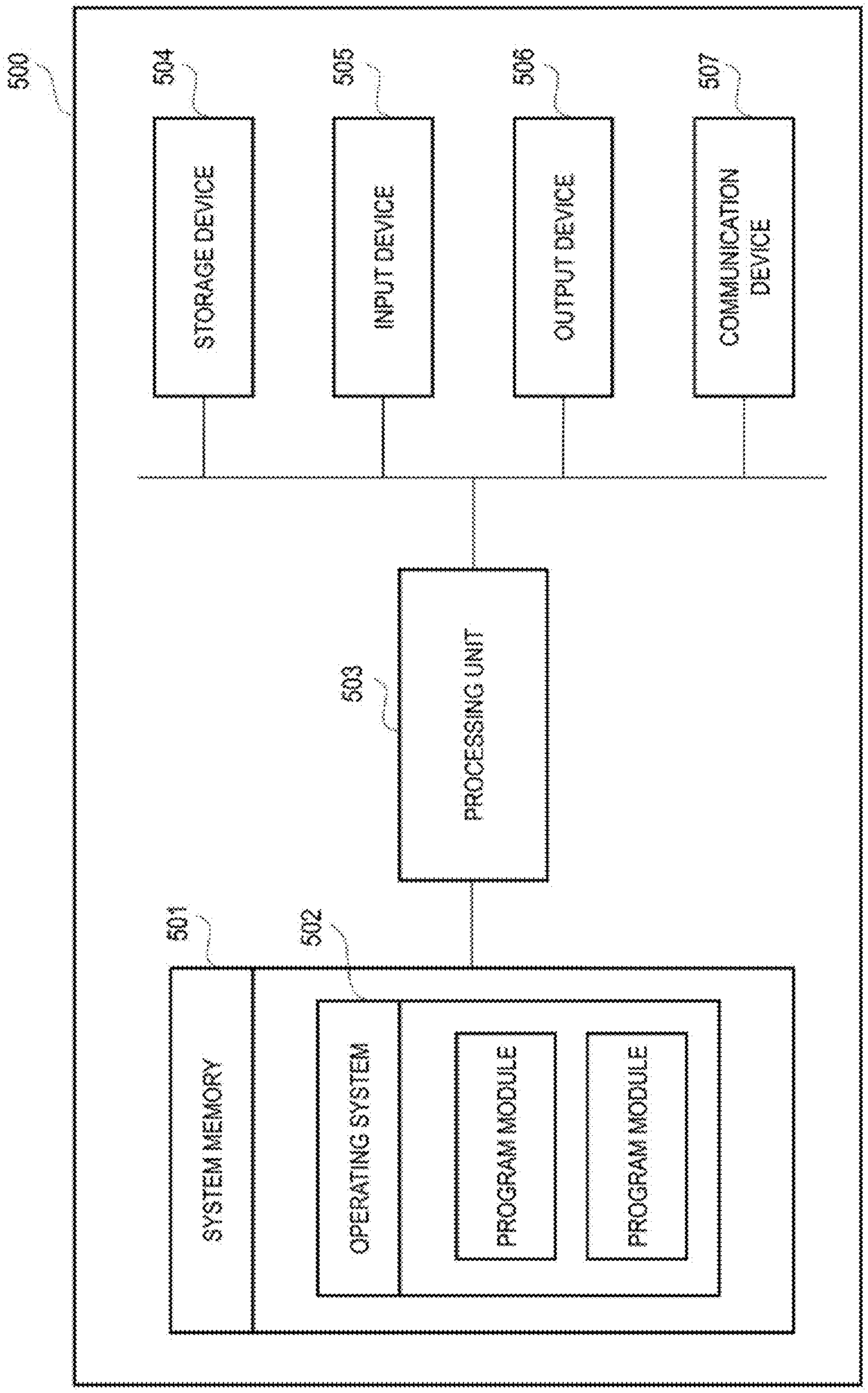
FIG. 5 is a diagram for describing an exemplary computing operating environment of a service server according to an embodiment of the present disclosure.

FIG. 5 is a diagram for describing an exemplary computing operating environment of a service server according to an embodiment of the present disclosure.

FIG. 5 is intended to provide a general and simplified description of a suitable computing environment in which embodiments of the service server may be implemented. Referring to FIG. 5, a computing device 500 is illustrated as an example of a service server.

The computing device 500 may include at least a processing unit 503 and a system memory 501.

The computing device 500 may also include a plurality of processing units that cooperate in executing a program.

Depending on the exact configuration and type of the computing device 500, a system memory 501 may be volatile memory (e.g., RAM), nonvolatile memory (e.g., ROM, flash memory, etc.), or a combination thereof. The system memory 501 includes a suitable operating system 502 for controlling the operation of the platform, such as the WINDOWS operating system from Microsoft Corporation. The system memory (501) may include one or more software applications, such as program modules or applications.

The computing device 500 may include additional data storage devices 504, such as magnetic disks, optical disks, or tapes. Such additional storage device 504 may be removable storage and/or fixed storage. Computer-readable storage media may include volatile and non-volatile media and removable and stationary media that are implemented for storing information, such as computer-readable instructions, data structures, program modules, or other data, using any method or technique.

Both the system memory 501 and the storage device 504 are all examples of computer-readable storage media. The computer-readable storage media may include, but are not limited to, memory devices such as a random access memory (RAM), a read-only memory (ROM), an electrically erasable programmable read-only memory (EEPROM), a flash memory, and others, optical storages such as a compact disc read only memory (CD-ROM), a digital versatile disk (DVD) or other optical storage, magnetic tape, magnetic disk storage, and others, and any other medium capable of storing desired information and being accessed by the computing device 500.

An input device 505 of the computing device 500 may include, for example, a keyboard, a mouse, a pen, a voice input device, a touch input device, and comparable input devices. The input device 505 is well known in the art, and therefore, a detailed description thereof will be omitted.

An output device 506 of the computing device 500 may include, for example, a display, a speaker, a printer, and other types of output devices. The output device 506 is well known in the art, and therefore, a detailed description thereof will be omitted.

The computing device 500 may also include a communication device 507 that allows the computing device 500 to communicate with other devices over, for example, a distributed computing environment network, such as a wired or wireless network, a satellite link, a cellular link, or a short-range network, using comparative mechanism. The communication device 507 is one example of a communication medium, which may include computer-readable instructions, data structures, program modules, or other data therein. Examples of the communication medium may include, but is not limited to, wired media such as a wired network and direct-wired connection, and wireless media such as acoustic, a radio frequency (RF), infrared rays, and others.

Methods according to various embodiments of the present application may be implemented in a form of program instructions that may be executed through various computing devices and may be recorded in a computer-readable recording medium. The computer-readable recording medium may include program instructions, data files, data structures or the like, alone or a combination thereof. The program instructions recorded in the computer-readable recording medium may be specially designed and configured for the embodiments or be known to those skilled in a field of computer software. Examples of the computer-readable recording medium may include a magnetic media such as a hard disk, a floppy disk, or a magnetic tape; an optical medium such as a compact disk read only memory (CD-ROM) or a digital versatile disk (DVD); a magneto-optical medium such as a floptical disk; and a hardware device specially configured to store and execute program commands, such as a ROM, a random access memory (RAM), a flash memory, or the like. Examples of the program instructions include high-level language codes capable of being executed by a computer using an interpreter or the like, as well as machine language codes made by a compiler. The above-described hardware device may be constituted to be operated as one or more software modules to perform the operations of the embodiments, and vice versa.

According to the embodiment of the present disclosure, it is possible to improve the accuracy of vector search for multimodal data.

Furthermore, according to the embodiment of the present disclosure, it is possible to improve the efficiency of the vector database system by encoding various types of data, such as text, images, audio, video, tables, and graphs, into a single vector space and connecting the vector distribution for each modality.

Effects of the present disclosure are not limited to the above-described effects, and effects that are not mentioned will be clearly understood by those skilled in the art to which the present disclosure pertains from the present specification and the accompanying drawings.

Embodiments have been described hereinabove by restrictive examples and drawings, but various modifications and variations may be made from the above description by those skilled in the art. For example, even though the described technologies are performed in an order different from that of the described method, and/or components of the described system, structure, device, circuit, and the like may be coupled to or combined with each other in a form different from that of the described method, or are replaced by other components or their equivalents, appropriate results may be achieved.

Therefore, other implementations, other embodiments, and equivalents of the claims fall within the scope of the following claims.

What is claimed is:

1. A method of searching vectors for multimodal data in a server, the method comprising:

generating a first vector index structure for first modality data, wherein the generating of the first vector index structure comprises applying the first modality data to a vector embedding model, and the first vector index structure is a graph including nodes representing feature values of data points and edges representing correlations between multiple nodes;

generating a second vector index structure for second modality data different from the first modality data, wherein the generating of the second vector index structure comprises (i) applying the first modality data to a modality transformation module to generate the second modality data and (ii) applying the second modality data to the vector embedding model to generate the second vector index structure, wherein the generating of the second vector index structure includes extracting, via the vector embedding model fine-tuned by minimizing a contrastive loss over a positive pair data set and a negative pair data set, semantically-aligned vector representations from a common embedding space for the first modality data and the second modality data, the modality transformation module is a generation model of an encoder-decoder structure, and the second vector index structure is a graph including nodes representing feature values of data points and edges representing correlations between multiple nodes;

connecting the first vector index structure and the second vector index structure, wherein the connecting of the first vector index structure and the second vector index structure comprises connecting nodes of the second vector index structure to corresponding nodes of the first vector index structure, wherein the first vector index structure and the second vector index structure are connected by linking each node of the second vector index structure to an embedding node of the first vector index structure corresponding to the first modality data used to generate the second modality data, the corresponding nodes representing original modality data from which other modality data represented by the nodes of the second vector index structure are generated;

receiving a query and generating a query vector by applying the query to the vector embedding model; and searching for a node similar to the query vector using the connected first vector index structure and the second vector index structure.

2. The method of claim 1, wherein the generating of the second vector index structure includes extracting a vector representation for the second modality data from the same embedding space as the first vector index structure to generate the second vector index structure.

3. The method of claim 1, wherein the connecting of the first vector index structure and the second vector index structure includes connecting all target nodes of the first vector index structure and the second vector index structure.

4. The method of claim 1, wherein the connecting of the first vector index structure and the second vector index structure includes randomly extracting all target nodes of the first vector index structure and the second vector index structure and connecting the extracted target nodes.

5. A server for searching for vectors for multimodal data, the server comprising:

a communication unit that receives a query; and a processor that executes instructions, wherein the processor is configured to execute the instructions to:

generate a first vector index structure for first modality data, wherein the generating of the first vector index structure comprises applying the first modality data to a vector embedding model, and the first vector index structure is a graph including nodes representing feature values of data points and edges representing correlations between multiple nodes, generate a second vector index structure for second modality data different from the first modality data, wherein the generating of the second vector index structure comprises (i) applying the first modality data to a modality transformation module to generate the second modality data and (ii) applying the second modality data to the vector embedding model to generate the second vector index structure, wherein the generating of the second vector index structure includes extracting, via the vector embedding model fine-tuned by minimizing a contrastive loss over a positive pair data set and a negative pair data set, semantically-aligned vector representations from a common embedding space for the first modality data and the second modality data, the modality transformation module is a generation model of an encoder-decoder structure, and the second vector index structure is a graph including nodes representing feature values of data points and edges representing correlations between multiple nodes, connect the first vector index structure and the second vector index structure, wherein the connecting of the first vector index structure and the second vector index structure comprises connecting nodes of the second vector index structure to corresponding nodes of the first vector index structure, wherein the first vector index structure and the second vector index structure are connected by linking each node of the second vector index structure to an embedding node of the first vector index structure corresponding to the first modality data used to generate the second modality data, the corresponding nodes representing original modality data from which other modality data represented by the nodes of the second vector index structure are generated;

generate a query vector by applying the query to the vector embedding model; and search for a node similar to the query vector using the connected first vector index structure and the second vector index structure.

6. The server of claim 5, wherein the generating of the second vector index structure includes extracting a vector representation for the second modality data from the same embedding space as the first vector index structure to generate the second vector index structure.

7. The server of claim 5, wherein the connecting of the first vector index structure and the second vector index structure includes connecting all target nodes of the first vector index structure and the second vector index structure.

8. The server of claim 5, wherein the connecting of the first vector index structure and the second vector index structure includes randomly extracting all target nodes of the first vector index structure and the second vector index structure and connecting the extracted target nodes.

9. A non-transitory computer-readable recording medium on which a computer program executed by a computer device is recorded, wherein the computer program performs:

generating a first vector index structure for first modality data, wherein the generating of the first vector index structure comprises applying the first modality data to a vector embedding model, and the first vector index structure is a graph including nodes representing feature values of data points and edges representing correlations between multiple nodes;

generating a second vector index structure for second modality data different from the first modality data, wherein the generating of the second vector index structure comprises (i) applying the first modality data to a modality transformation module to generate the second modality data and (ii) applying the second modality data to the vector embedding model to generate the second vector index structure, wherein the generating of the second vector index structure includes extracting, via the vector embedding model fine-tuned by minimizing a contrastive loss over a positive pair data set and a negative pair data set, semantically-aligned vector representations from a common embedding space for the first modality data and the second modality data, the modality transformation module is a generation model of an encoder-decoder structure, and the second vector index structure is a graph including nodes representing feature values of data points and edges representing correlations between multiple nodes;

connecting the first vector index structure and the second vector index structure, wherein the connecting of the first vector index structure and the second vector index structure comprises connecting nodes of the second vector index structure to corresponding nodes of the first vector index structure, wherein the first vector index structure and the second vector index structure are connected by linking each node of the second vector index structure to an embedding node of the first vector index structure corresponding to the first modality data used to generate the second modality data, the corresponding nodes representing original modality data from which other modality data represented by the nodes of the second vector index structure are generated;

receiving a query and generating a query vector by applying the query to the vector embedding model; and searching for a node similar to the query vector using the connected first vector index structure and the second vector index structure.

10. The non-transitory computer-readable recording medium of claim 9, wherein the generating of the second vector index structure includes extracting a vector representation for the second modality data from the same embedding space as the first vector index structure to generate the second vector index structure.

11. The non-transitory computer-readable recording medium of claim 9, wherein the connecting of the first vector index structure and the second vector index structure includes connecting all target nodes of the first vector index structure and the second vector index structure.

12. The non-transitory computer-readable recording medium of claim 9, wherein the connecting of the first vector index structure and the second vector index structure includes randomly extracting all target nodes of the first vector index structure and the second vector index structure and connecting the extracted target nodes.

* * * * *